(No Model.)

E. DILLON.
FLAT IRON HEATER.

No. 346,740. Patented Aug. 3, 1886.

WITNESSES:
Thos. Houghton.
Amos W. Hart

INVENTOR:
Ellen Dillon
BY Munn & Co
ATTORNEYS.

UNITED STATES PATENT OFFICE.

ELLEN DILLON, OF SIOUX CITY, IOWA.

FLAT-IRON HEATER.

SPECIFICATION forming part of Letters Patent No. 346,740, dated August 3, 1886.

Application filed November 10, 1885. Serial No. 182,382. (No model.)

*To all whom it may concern:*

Be it known that I, ELLEN DILLON, of Sioux City, in the county of Woodbury and State of Iowa, have invented a new and useful Improvement in Flat-Iron Heaters, of which the following is a description.

My invention is an improvement in that class of flat or sad iron heaters having a vertical or nearly vertical portion with which the faces of the irons are placed in contact while being heated.

In practice my improved heater is constructed of two parts—namely, a base or horizontal portion having a hollow pyramidal portion. The whole is constructed of perforated sheet metal, and a conical slotted cover for such base portion.

My invention pertains more particularly to the former, as will be hereinafter described.

Figure 1:
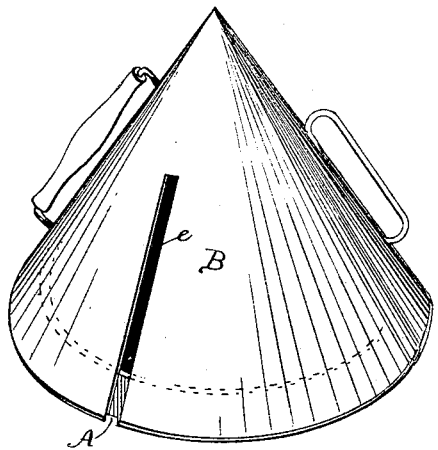
Figure 2:
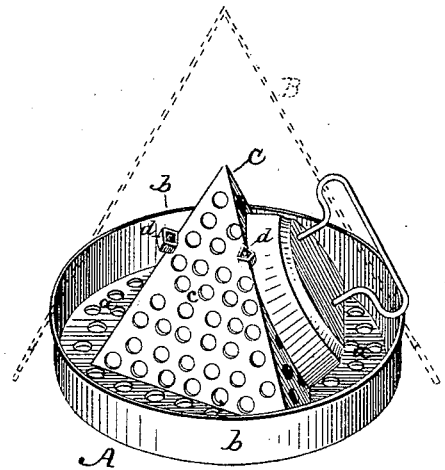
Figure 3:
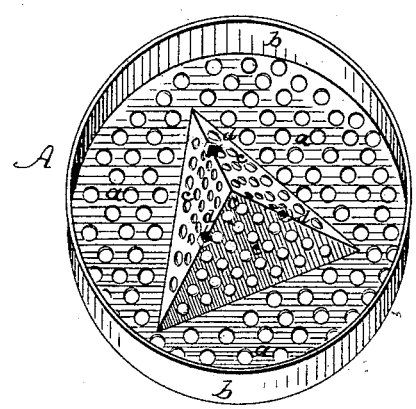

In accompanying drawings, Figure 1 is a perspective view of the heater complete. Fig. 2 is a (side) perspective view of the base, showing an iron applied thereto as in practice. Fig. 3 is a (plane) perspective of the base.

The base or body portion A has a horizontal part, $a$, provided with a narrow vertical rim, $b$, and a central pyramidal part, $c$. The whole is made of woven wire or perforated sheet metal, preferably the latter, as represented in the drawings.

The irons to be heated are placed with their faces in close contact with the plane sides of the pyramid $c$, their bases or wider ends resting on the flat part $a$, as shown. In some cases I propose to provide the pyramid with lugs $d$, attached to its angles, for the purpose of holding the irons more securely in place.

The conical detachable top or cover B is provided with a handle, and with vertical slots $e$, to accommodate the sad-iron handles, so that they may not become unduly heated. When the cover B is in place, as shown in Fig. 1, it rests on the rim $b$ of part A, and also on the stove, so that the heat is well confined. Said cover also aids in holding the sad-irons in due position as related to the faces of the pyramidal portion $c$.

The object of the perforations in base A is to permit due access of heat to the faces and bases of the sad-irons, so that they will be quickly heated to the required degree; but in some cases the base $a$ may be made imperforate. I have found by experiment that when irons are placed in contact with an imperforate surface they heat very slowly; much more so, in fact, than when the surface is constructed in the manner shown. For the purposes of economy of fuel and time this construction is therefore obviously important.

In practical use the heater is placed horizontally on a stove top or over a stove-hole, so that it is exposed to reflected or directly-radiated heat. It may be constructed at very small cost, and forms a very useful adjunct of the ordinary heater or stove.

I do not claim, broadly, a perforated pyramidal body having a horizontal base, since I am well aware this combination of parts is not new.

What I claim is—

1. The improved flat-iron heater consisting of the horizontal perforated base-plate A and the pyramidal body $c$, perforated over its whole surface and open at the bottom, said parts (A $c$) being connected as shown and described.

2. The combination of the conical slotted cover B with the body portion A, having the central elevated part, $c$, and surrounding vertical rim $b$, on which said cover rests, as shown and described.

ELLEN DILLON.

Witnesses:
CHAS. M. SWAN,
GEO. C. FOSTER.